United States Patent
Ha

(10) Patent No.: US 6,493,047 B2
(45) Date of Patent: Dec. 10, 2002

(54) LIQUID CRYSTAL DISPLAY PANEL HAVING ELECTROSTATIC DISCHARGE PREVENTION CIRCUITRY

(75) Inventor: Yong-Min Ha, Kyongki-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 2 days.

(21) Appl. No.: 10/036,386

(22) Filed: Jan. 7, 2002

(65) Prior Publication Data

US 2002/0057392 A1 May 16, 2002

Related U.S. Application Data

(62) Division of application No. 09/129,474, filed on Aug. 4, 1998, now Pat. No. 6,337,722.

(30) Foreign Application Priority Data

Aug. 7, 1997 (KR) .............................................. 97-37755
Jun. 30, 1998 (KR) .............................................. 98-25633

(51) Int. Cl.[7] ........................ G02F 1/1333; H01L 23/62; G09G 3/36
(52) U.S. Cl. ............................. 349/40; 257/360; 345/92
(58) Field of Search ............................. 349/40, 42, 39, 349/38; 257/355, 360; 345/92, 904

(56) References Cited

U.S. PATENT DOCUMENTS

| | | | | |
|---|---|---|---|---|
| 5,220,443 A | * | 6/1993 | Noguchi | 257/328 |
| 5,233,448 A | * | 8/1993 | Wu | 257/452 |
| 5,671,026 A | * | 9/1997 | Shiraki et al. | 257/356 |
| 5,926,234 A | * | 7/1999 | Shiraki et al. | 257/355 |
| 5,936,687 A | * | 8/1999 | Lee | 345/69 |
| 5,973,658 A | * | 10/1999 | Kim et al. | 345/100 |
| 6,369,998 B1 | * | 4/2002 | Anderson | 261/118 |
| 6,384,870 B1 | * | 5/2002 | Kempisty | 348/558 |

* cited by examiner

Primary Examiner—William L. Sikes
Assistant Examiner—Tarifur R. Chowdhury
(74) Attorney, Agent, or Firm—McKenna Long & Aldridge LLP

(57) ABSTRACT

A liquid crystal display (ALCD@) panel having electrostatic discharge (AESD@) prevention circuitry. The LCD panel includes a plurality of gate lines connected to a gate driving circuit and a plurality of data lines connected to a data driving circuit, the gate lines and the data lines intersect to define a pixel array. The LCD panel further comprises a plurality of ESD prevention circuits each having at least one switching device and at least one control terminal connected to the switching device, each ESD prevention circuit connected between an end of a gate or data line and a common wire. The ends of the gate and data lines are thereby coupled in common by the common wire. The switching device is turned on by electrostatic voltages generated at the gate and/or data lines during LCD panel fabrication, and is turned off by control signals applied at the control terminal during panel testing and normal operation.

11 Claims, 8 Drawing Sheets

LIQUID CRYSTAL DISPLAY PANEL HAVING ELECTROSTATIC DISCHARGE PREVENTION CIRCUITRY

This application is a divisional of application Ser. No. 09/129,474 filed on Aug. 4, 1998, now U.S. Pat. No. 6,337,722.

This application claims the benefit of Korean Application No. 97-37755, filed on Aug. 7, 1997, and No. 98-25633, filed on Jun. 30, 1998, which are hereby incorporated by reference.

BACKGROUND OF THE INVENTION

1. Field of the Invention

The present invention relates to a liquid crystal display ("LCD") panel having electrostatic discharge ("ESD") prevention circuitry for reducing static electricity. In particular, it relates to an LCD panel having ESD prevention circuitry that allows testing of the panel during manufacturing as well as normal operation of the panel thereafter.

2. Discussion of the Related Art

During the fabrication process of an LCD panel, high voltages often develop, such as by friction or discharge, across various electrical components of the panel. Such high voltages may generate instant currents that flow through the wires, the intersections of the wires, and the thin film transistors ("TFTs") formed on the LCD panel. This causes defects and malfunctions in the panel such as an electrical short or open. It is therefore desirable to reduce or eliminate static electricity especially during the manufacturing process of the LCD panel.

FIG. 1 shows a prior technique for static electricity prevention. An LCD panel includes a plurality of intersecting gate lines G1 to GN and data lines D1 to DM. Each of the gate lines G1 to GN is connected at a first end to a gate driving circuit 2 which provides gate signals for the LCD panel, and each of the data lines D1 to DN is connected at a first end to a data driving circuit 4 which provides data signals for the LCD panel. The intersecting gate and data lines define a pixel array or matrix. At each intersection of a gate line and a data line, a pixel element comprising a TFT 10 and a pixel electrode 12 is electrically coupled to the gate and data lines.

Each of the data lines D1 to DM and the gate lines G1 to GM is electrically coupled at a second end to a common shorting bar SB. During fabricating, electrostatic discharge is reduced or prevented because the common shorting bar SB shorts the gate and data lines. The common shorting bar, however, may interfere with the testing of the LCD panel during manufacturing as well as the intended normal operation of the panel, both of which require voltage differences to be applied across the data and gate lines. Thus, this ESD prevention technique requires an additional step of removing the shorting bar after the LCD panel is formed.

FIG. 2 shows another prior technique for static electricity prevention. Identical components in FIGS. 2 and 1 are designated by identical reference symbols. In this device, a transistor 14 is electrically coupled between the common shorting bar SB and the second end of each of the data lines D1 to DM and gate lines G1 to GN. The two gate electrodes of the CMOS transistor 14 are coupled to the data or gate line and the common shorting bar, respectively. The transistors 14 act as diodes. When a voltage is applied to the data or gate line due to static electricity, the transistor 14 is turned on to allow a current to flow between the data or gate line and the common shorting bar SB through the current path of the transistor. This reduces the voltage difference across the transistor 14 until the gate voltages are sufficiently low that the transistor is turned off. Since all data and gate lines are coupled to the common short bar SB via transistors, ESD is reduced or prevented during the fabricating process.

However, during panel testing and normal operations of the LCD panel, the transistors 14 may be turned on, and the signals on the data and gate lines may become distorted due to the currents that flow between the gate lines and the data lines through the transistors, which have low turn-on resistance.

SUMMARY OF THE INVENTION

Accordingly, the present invention is directed to an LCD panel having ESD prevention circuitry that substantially obviates one or more of the problems due to limitations and disadvantages of the prior technique and related art.

An object of the present invention is to provide an LCD panel having ESD prevention circuitry by using switching devices.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel for static electricity prevention includes a plurality of gate lines from a gate driver and a plurality of data lines from a data driver, the gate lines and data lines forming a pixel array, a switching device and a pixel electrode are connected electrically to each pixel, a plurality of static electricity prevention circuits having at least one switching device, each static electricity prevention circuit connected to ends of the gate line and the data line; a common wire connected to each static electricity prevention circuit, the common wire coupling the gate lines with data lines in common; and at least one control part connected to each static electricity prevention circuit, the control part generating a control signal which turns off the switching device.

In another aspect of the present invention, a liquid crystal display panel having electrostatic discharge prevention circuitry comprises a plurality of gate lines; a plurality of data lines, the gate lines and the data lines define an array of pixels; a plurality of switching devices respectively connected to the pixels, the switching devices connected to the gate lines and data lines; a common line; and a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal.

In another aspect of the present invention, a method for making a liquid crystal display panel having electrostatic discharge prevention circuitry comprises the steps of forming a plurality of gate lines; forming a plurality of data lines, the gate lines and the data lines defining an array of pixels; forming a plurality of switching devices respectively connected to the pixels, the switching devices connected to the gate lines and data lines; forming a common line; and forming a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, an LCD panel having ESD prevention circuitry is provided by using switching devices that are turned on by a voltage of the static electricity during fabrication, but can be turned off during panel testing or normal operation by a control signal. The ends of the gate lines and data lines of the LCD panel are coupled to each other by switching devices that switch on and off in response to both the static electricity on the gate and data lines and a control signal applied at a control terminal. During fabrication, the control terminals of the switching devices are in a floating state and the switches are turned on by electrostatic voltages at the gate and data lines. The switches therefore conductively couple the gate and data lines to each other, reducing or preventing harmful electrostatic discharge through pixel elements between such lines. During panel testing and normal operation after the LCD panel is completed, a control signal is applied to the control terminals of the switching devices to switch them off, thereby electrically decoupling the gate lines and data lines from each other. The switches are maintained in the turned-off state by the control signal even when voltage differences exist between the gate and data lines during testing or normal operation.

Figure 1:
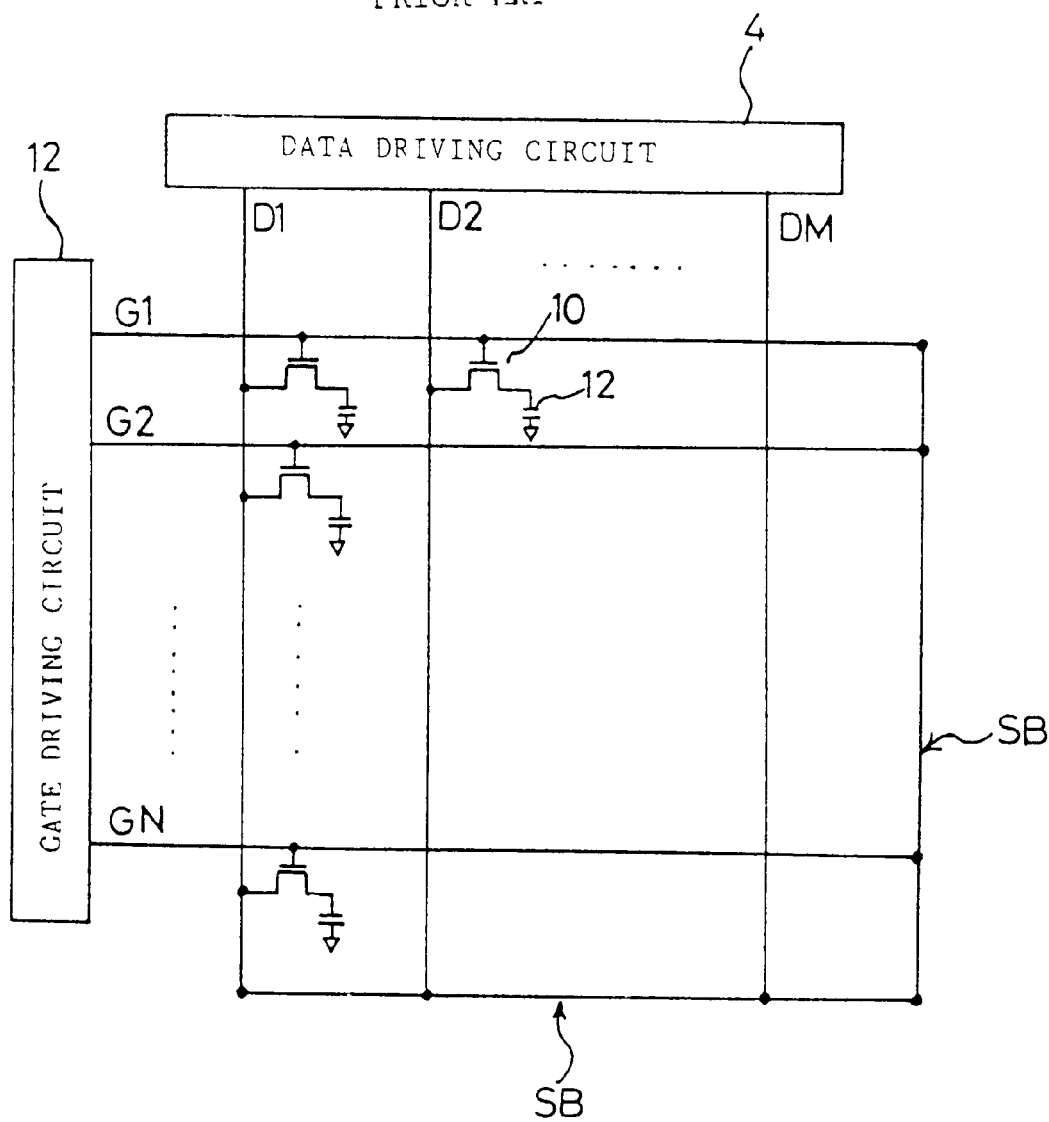
FIG. 1 shows a technique for static electricity prevention.
Figure 2:
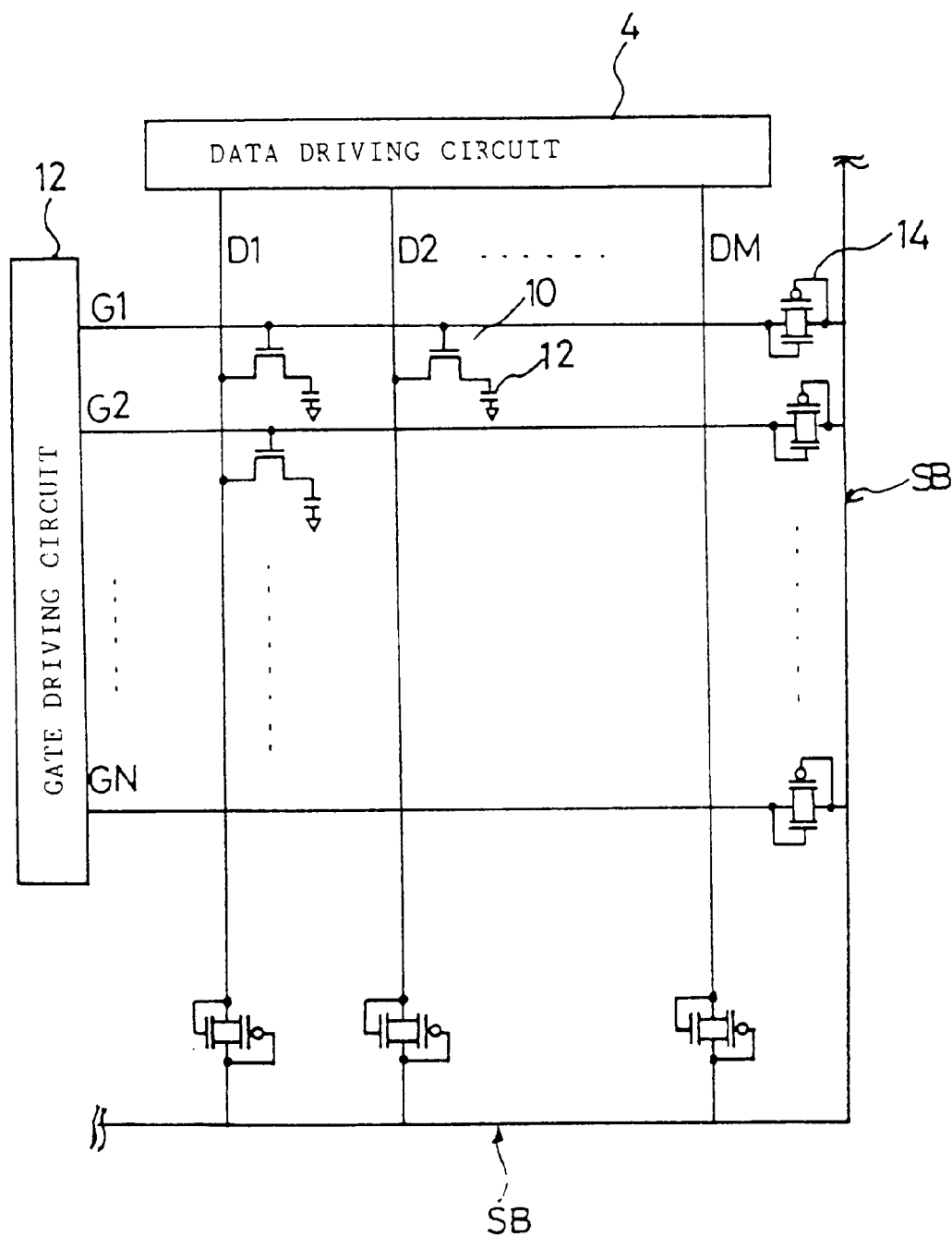
FIG. 2 shows another technique for static electricity prevention.
Figure 3A:
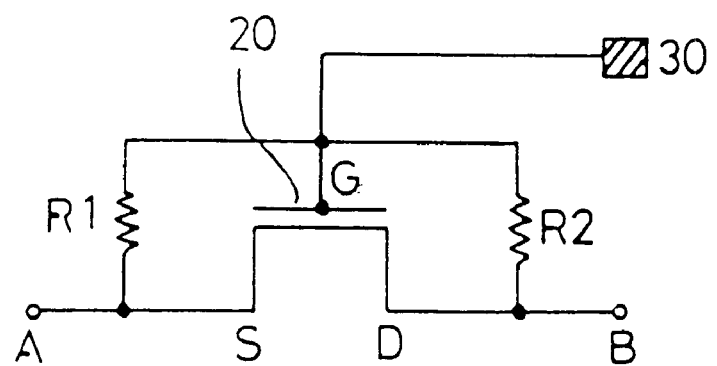
FIGS. 3A–3D show preferred embodiments of ESD prevention circuits according to the present invention.
Figure 3B:
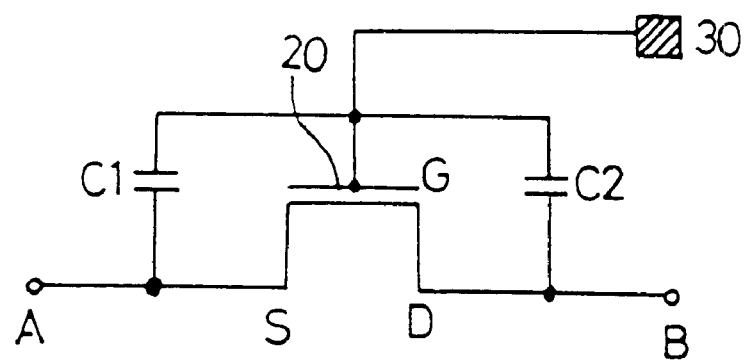

FIGS. 3A–3D illustrate embodiments of ESD prevention circuits according to the present invention. Referring to FIG. 3A, the ESD prevention circuit includes a transistor 20, a first resistor R1 and a second resistor R2. A source electrode S and a drain electrode D of the transistor 20 are coupled to the coupling terminals A and B of the circuit, respectively. A gate electrode G of the transistor 20 is connected to a control terminal 30 for receiving a control signal. The resistors R1 and R2 are connected between the source S and the gate G, and between the gate G and the drain D of the transistor 20, respectively. Either a PMOS or an NMOS device may be used for the transistor 20. The circuit shown in FIG. 3B is similar to that of FIG. 3A (with identical components designated by identical reference symbols), except that instead of the resistors R1 and R2, first and second capacitors C1 and C2 are provided in their place.

The transistor 20 in FIGS. 3A and 3B acts as a switching device. When the control signal at the control terminal 30 is in a first state, the circuit is in a floating state, and a voltage generated by the terminals A and B is applied to the gate G of the transistor 20 through the resistors R1 and R2 (or the capacitors C1 and C2). When the gate voltage reaches a sufficient level, the transistor 20 is turned on and a current flows between terminals A and B. On the other hand, when the control signal at the control terminal 30 is in a second state, such as a predetermined voltage level, the transistor 20 is turned off.

In this specification, when a switching device is said to be Aturned on, @ it is meant that the device permits a current to flow across its current path with a small resistance. When a switching device is said to be Aturned off,@ it is meant that a substantially larger resistance exists across the switching device, even though a small current may still flow through it.

Figure 3C:
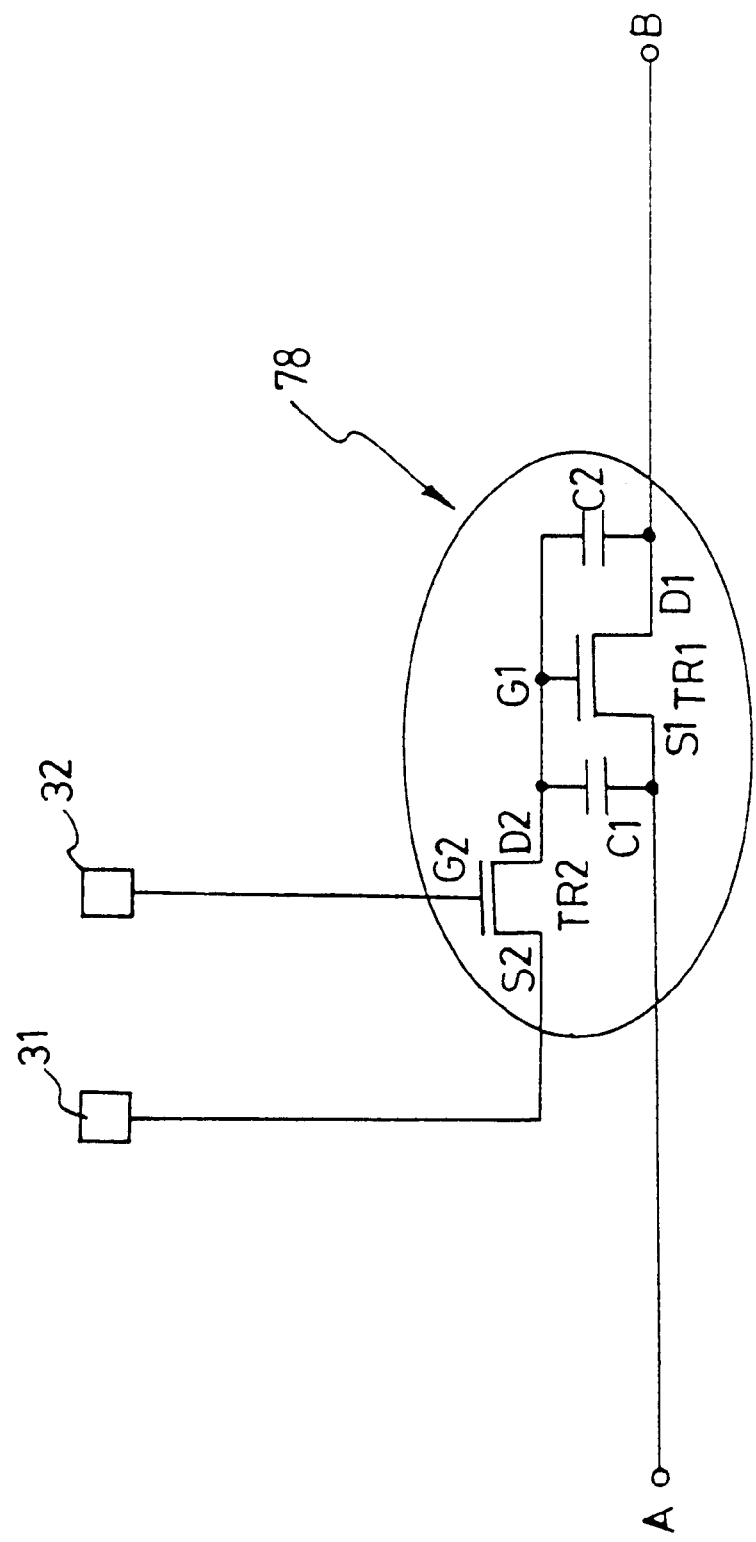

Referring now to FIG. 3C, another embodiment of the ESD prevention circuit includes first and second transistors TR1 and TR2, and first and second capacitors C1 and C2. A source electrode S1 and a drain electrode D1 of the first transistor TR1 are respectively coupled to the coupling terminals A and B of the circuit. A gate electrode G1 of the first transistor TR1 is connected to a drain electrode D2 of the second transistor TR2. The gate electrode G2 and the source electrode S2 of the second transistor TR2 are connected to first and second control terminals 32 and 31, respectively. The first and second capacitors C1 and C2 are connected between the source S1 and the gate G1, and between the gate G1 and the drain D1 of the first transistor TR1, respectively. Either PMOS or NMOS devices may be used for the transistors TR1 and TR2.

Figure 3D:
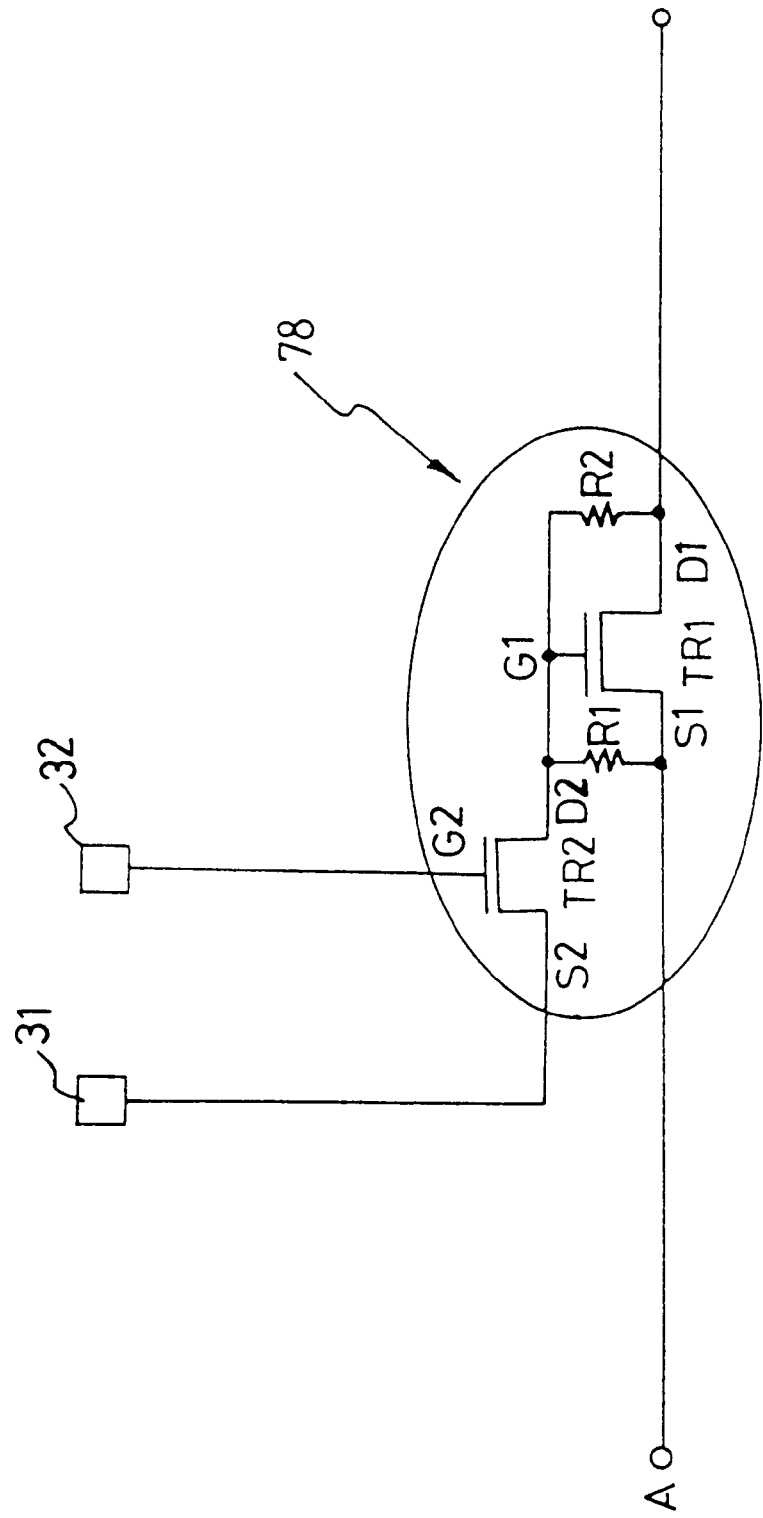

The circuit shown in FIG. 3D is similar to that of FIG. 3C (with identical components designated by identical reference symbols), except that instead of the capacitors C1 and C2, first and second resistors R1 and R2 are provided in their place.

The first transistor TR1 in the device of FIGS. 3C or 3D acts as a switch between terminals A and B, and is controlled by the control signals on the first and second control terminals 32 and 31. When the first signal applied at the gate G2 through the first control terminal 32 is in a first state, the second transistor TR2 is turned off and the gate G1 of the first transistor TR1 is in a floating state. When in the floating state, the voltages at the terminals A and B are applied to the gate G1 through the resistors R1 and R2 (or the capacitors C1 and C2). If the gate voltage at G1 reaches a sufficient level, the transistor TR1 is turned on and a current flows between terminals A and B. To turn off the first transistor TR1, a first control signal in a second state is applied at the gate G2 to turn on the second transistor TR2, so that a second control signal applied at the source S2 of the second transistor TR2 through the terminal 31 is conducted to the gate G1 of the first transistor TR1 to turn it off.

Figure 4:
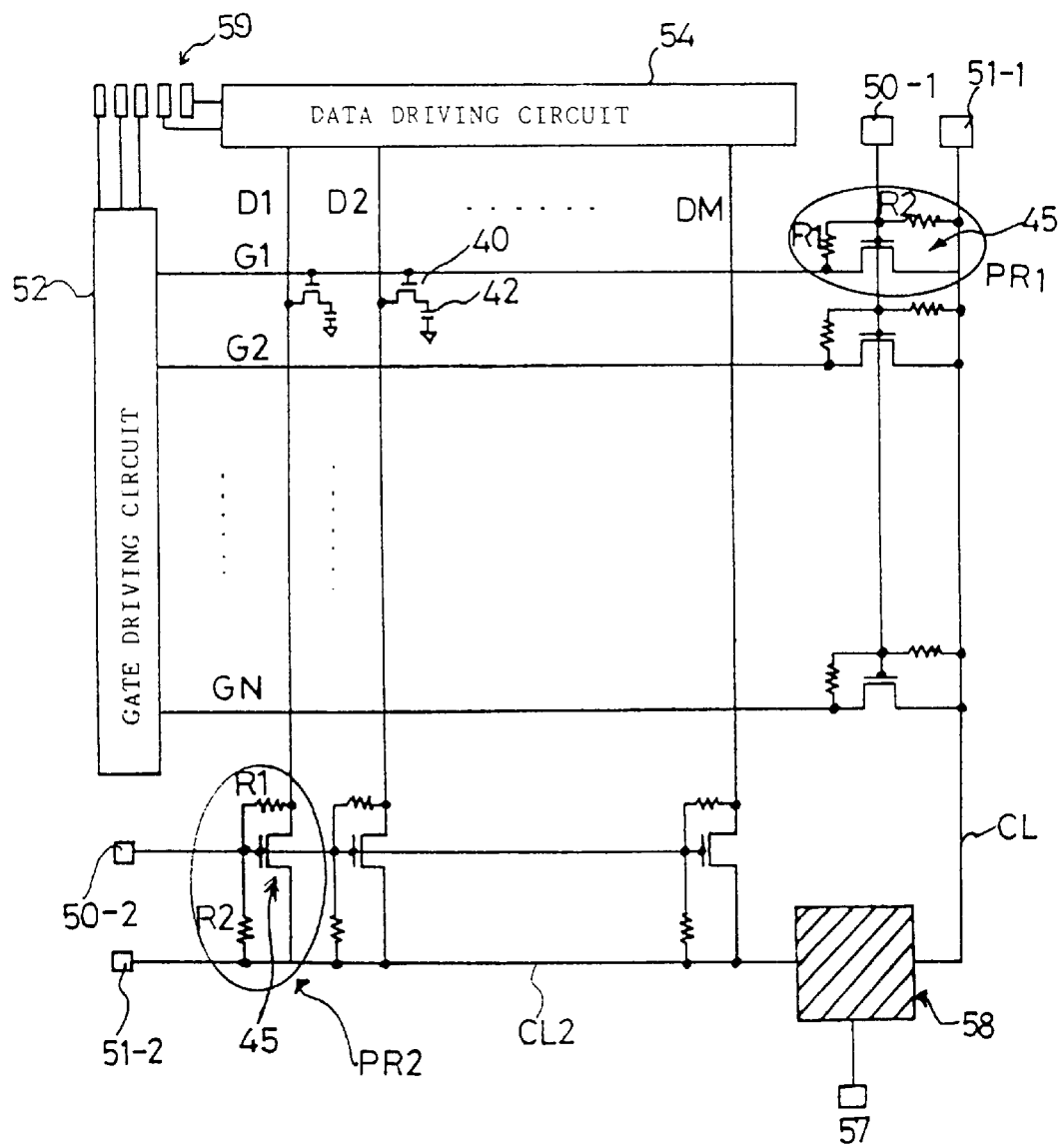
FIG. 4 shows an LCD panel according to a first embodiment of the present invention.

FIG. 4 is a schematic diagram of an LCD panel according to a first embodiment of the present invention, where the ESD prevention circuits shown in FIG. 3A are formed on the LCD panel.

Referring to FIG. 4, a plurality of intersecting gate lines G1 to GN and data lines D1 to DM are provided to define a pixel array or matrix. Each gate line is connected at a first end to a gate driving circuit 52 which provides gate signals, and each data line is connected at a first end to a data driving circuit 54 which provides data signals. At each intersection between a gate line and a data line, a pixel element comprising a thin film transistor 40 and a pixel electrode 42 is coupled to the gate and data lines. A signal input part 59 applies data and gate signals to the data and gate driving circuits 52 and 54, respectively.

A second end of each gate line is coupled through an ESD prevention circuit PR1 to a first common wire portion CL1, to which a port 51-1 is connected. The control terminals of the circuits PR1 are connected in common to a first control port 50-1. Similarly, a second end of each data line is coupled through an ESD prevention circuit PR2 to a second common wire portion CL2, to which a port 51-2 is connected. The control terminals of the circuit PR2 are connected in common to a second control port 50-2. The control ports 50-1 and 50-2 may be a common control port. The ESD prevention circuits PR1 and PR2 are turned on by an electrostatic voltage applied at the corresponding gate and data lines, and are turned off by a control signal at the control ports 50-1 and 50-2.

Each ESD prevention circuit PR1 and PR2 corresponds to a circuit shown in FIG. 3A, with one of the two terminals A and B shown in FIG. 3A coupled to the second end of the gate or data line, the other of the two terminals coupled to the common wire portion CL1 or CL2, and the control terminal 30 coupled to the control port 50-1 and 50-2. The transistors 45 shown in FIG. 4 correspond to the transistor 20 in FIG. 3A. The transistors 45 may be either NMOS or PMOS devices. Alternatively, although not shown in FIG. 4, each ESD prevention circuit PR1 and PR2 may also be a circuit shown in FIG. 3B. As yet another alternative, some of the circuits PR1 and PR2 may be circuits shown in FIG. 3A and some may be circuits shown in FIG. 3B.

Still referring to FIG. 4, the first common wire portion CL1 and the second common wire portion CL2 are coupled together by a common wire coupling circuit 58. In one embodiment, the coupling circuit 58 is a resistor. Preferably, the resistor has a resistance value substantially equal to or larger than 1 MΩ to ensure that the coupling of the lines CL1 and CL2 does not significantly distort the signals, if any, on the driving circuits 52 and 54, and to ensure that any continued current flow (leakage current) through the common wire does not significantly increase power consumption during normal operation of the LCD panel.

In another embodiment, the common wire coupling circuit 58 comprises a switching device that switches on and off in response to the voltage levels on the lines CL1 and CL2 as well as a control signal on a control line 57. In one such embodiment, the coupling circuit has the same structure as the ESD prevention circuits PR1 and PR2, i.e., the circuit shown in FIGS. 3A or 3B. In such an embodiment, the terminals A and B shown in FIGS. 3A or 3B are connected between the lines CL1 and CL2, and the control terminal 30 is connected to the control line 57. The control line 57 may be connected to the control port 50-1 or 50-2. The operation of this common line coupling circuit is similar to the ESD prevention circuits PR1 and PR2.

The operation of an LCD panel according to the embodiment of FIG. 4 is explained below.

During the fabrication of the LCD panel, the control signals applied at the control ports 50-1 and 50-2 are in the first state so that the switching circuits PR1 and PR2 are in a floating state. When an induced electrostatic voltage of a sufficient magnitude is applied to one or more of the gate and data lines, a voltage is applied at the gate of the transistor 45 of the associated ESD prevention circuits PR1 or PR2. This gate voltage turns on the transistor 45 to electrically couple the gate or data line to the common wire. Thus, the common wire maintains the gate and data lines of the LCD panel at substantially the same voltage levels and prevents harmful electrostatic buildup in these lines. As a result, the destruction of insulation between the gate lines and data lines is prevented, and the pixel switching characteristics of the LCD panel are preserved.

After the fabrication of the panel is completed, the gate lines and the data lines are electrically disconnected from each other, so that the signals at each gate line and data line may be controlled independently by the driving circuits 52 and 54. This is accomplished by applying a predetermined control signal to the gate electrodes of the transistors 45 via the control ports 50-1 and 50-2 to turn them off.

In the above operations, when the common wire coupling circuit 58 comprises a switching device, similar control signals as applied to the control ports 50-1 and 50-2 may be applied to the signal line 57 to switch the coupling circuit 58 on and off.

Figure 5:
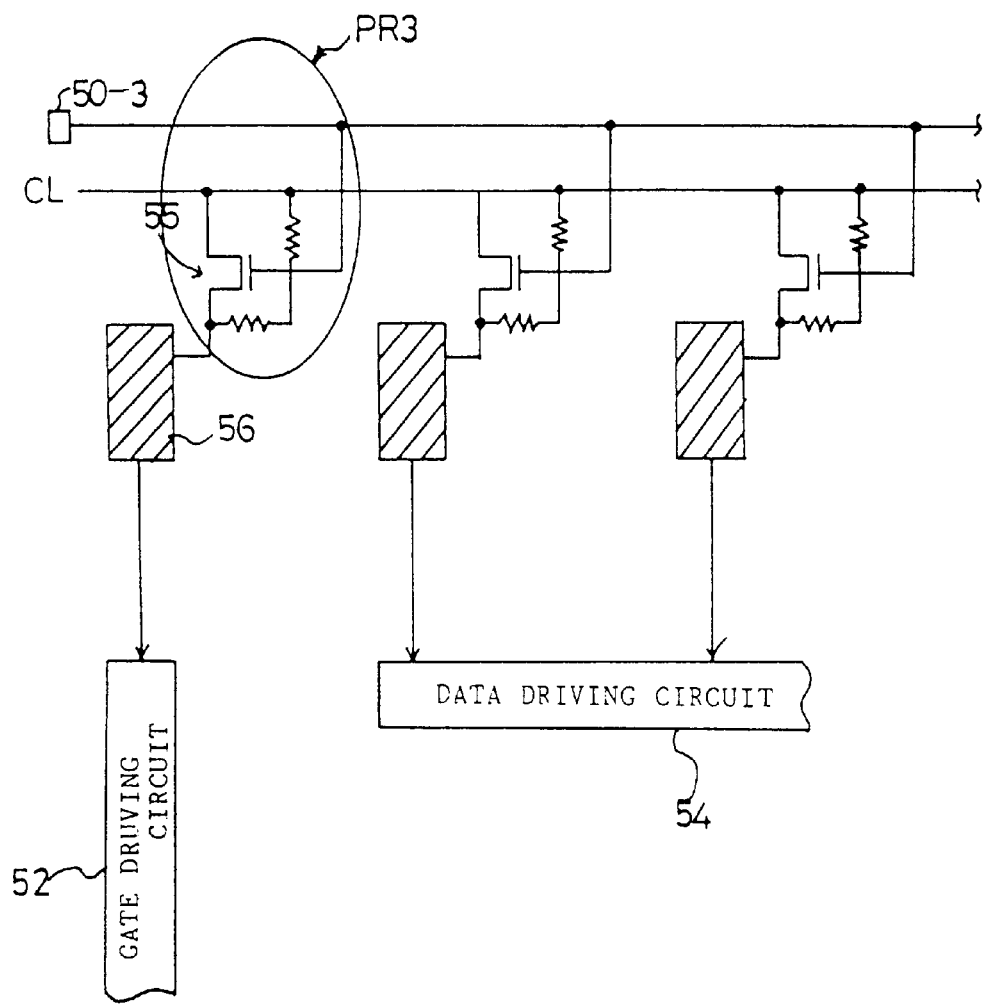
FIG. 5 shows a signal input part of an LCD panel according to a second embodiment of the present invention.

FIG. 5 is a schematic diagram of an LCD panel according to a second embodiment of the present invention, where the ESD prevention circuit shown in FIG. 3A, for example, are formed in the signal input part 59.

To prevent harmful ESD due to static electricity in the input lines for the driving circuits, ESD prevention circuits are formed in the signal input part 59 to commonly connect the input lines to a common wire CL3. As shown in FIG. 5, an ESD prevention circuit PR3 is connected to an input pad 56 of the driving circuits 52 and 54. The ESD prevention circuits PR3 are formed according to the embodiment of FIG. 3A, for example. Each circuit PR3 includes a transistor 55 having its drain and source electrodes connected between the input pad 56 and the common wire CL3, and its gate electrode connected to a control port 50-3. A first resistor R1 is connected between the source (or drain) and the gate, and a second transistor R2 is connected between the gate and the drain (or source). The transistor 55 may be either an NMOS or a PMOS device.

The ESD prevention circuits PR3 operate in substantially the same way as the ESD prevention circuits PR1 and PR2 in the embodiment of FIG. 4. During the fabrication of the LCD panel, the circuits PR3 are turned on by a voltage applied at the input signal lines of the driving circuits 52 and 54 to prevent electrostatic buildup in these lines. During normal operation of the panel after fabrication is completed, the transistors 55 are turned off and are maintained in the turned-off state by the application of a control signal at the gates of the transistors 55 via the control port 50-3. Thus, the input pads 56 are disconnected from each other and from the common wire CL3, so that the input signals for the LCD panel can be independently applied to the input lines.

In the embodiments of FIGS. 4 and 5, the resistors R1 and R2 in the ESD prevention circuits PR1, PR2 and PR3, as well as the resistors used in the coupling circuit 58, preferably have resistance values between the turn-on resistance and the turn-off resistance of the corresponding transistors.

If the resistance values of the resistors in the above circuits are not sufficiently large, these currents may distort the signals (if any) on the gate and data lines and the input signal lines, and/or increase power consumption (if any) due to continuous flow of current. Preferably, the resistance values of the resistors in the ESD prevention circuits and the coupling circuit are greater than 1 MΩ, for example.

Figure 6:
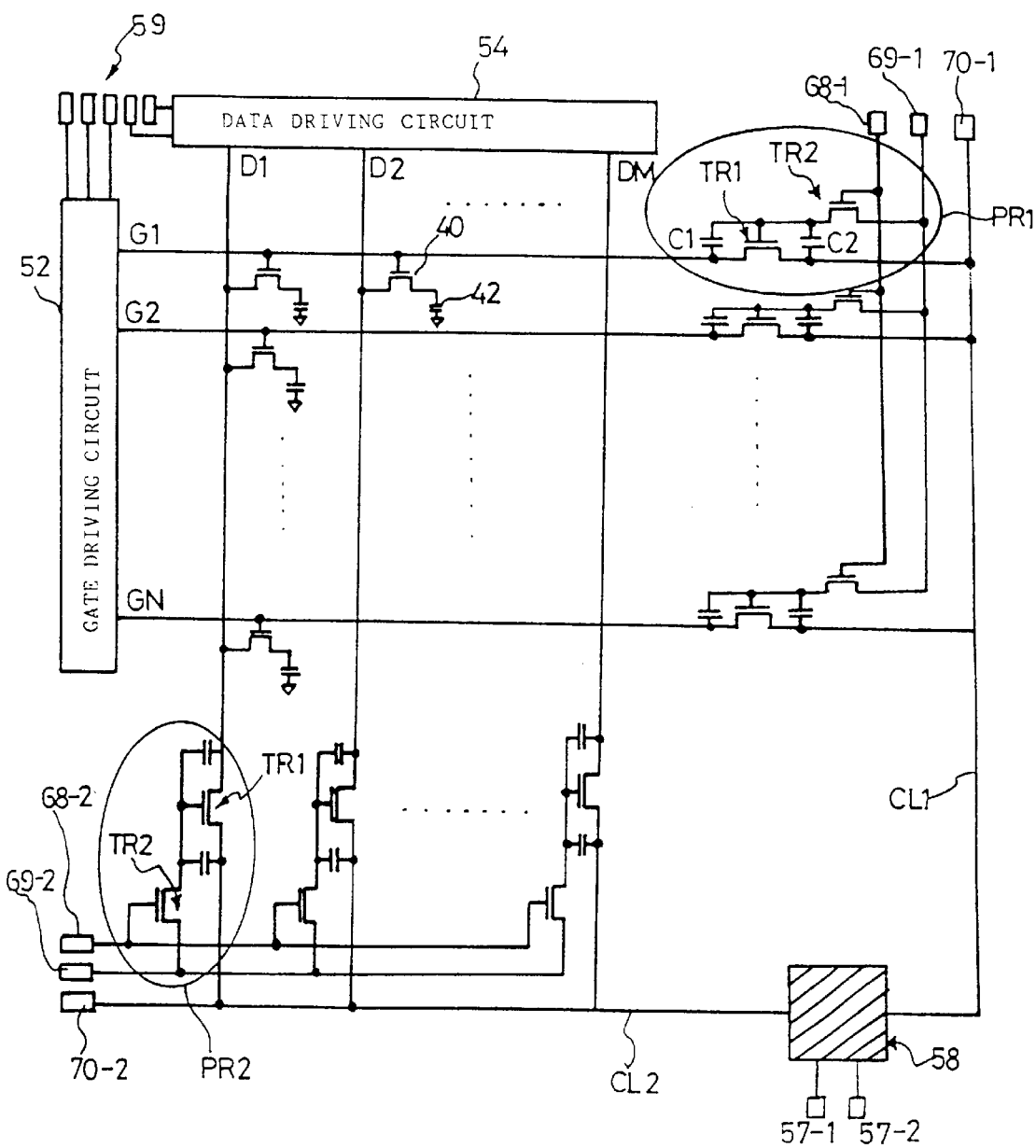
FIG. 6 shows an LCD panel according to a third embodiment of the present invention.

FIG. 6 is a schematic diagram of an LCD panel according to a third embodiment of the present invention, where ESD prevention circuits shown in FIG. 3C, for example, are formed on the LCD panel.

Referring to FIG. 6, a plurality of intersecting gate lines G1 to GN and data lines D1 to DM are provided to define a pixel array or matrix. Each gate line is connected at a first end to a gate driving circuit 52 which provides gate signals, and each data line is connected at a first end to a data driving 54 which provides data signals. At each intersection between a gate line and a data line, a pixel element comprising a thin film transistor 40 and a pixel electrode 42 coupled to the transistor 40 are formed. A signal input part 59 is connected to the data and gate driving circuits 52 and 54.

A second end of each gate line is coupled through an ESD prevention circuit PR1 to a first common wire portion CL1, to which a port 70-1 is connected. Each ESD prevention circuit PR1 has first and second control terminals. The first control terminals of circuits PR1 are connected in common to a first control port 68-1, and the second control terminals of circuits PR1 are connected in common to a second control port 69-1. Similarly, a second end of each data line is coupled through an ESD prevention circuit PR2 to a second common wire portion CL2, to which a port 70-2 is connected. Each ESD prevention circuit PR2 has first and second control terminals. The first control terminals of circuits PR2 are connected in common to a third control port 68-2, and the second control terminals of circuits PR2 are connected in common to a fourth control port 69-2. The control ports 68-1 and 68-2 may be a common control port, and the control ports 69-1 and 69-2 may be a common control port. The ESD prevention circuits PR1 and PR2 are turned on by an electrostatic voltage applied at the corresponding gate and data lines, and are turned off and maintained in an off state by control signals at the control ports 68-1, 68-2, 69-1 and 69-2.

Each ESD prevention circuit PR1 and PR2 corresponds to a circuit shown in FIG. 3C, with one of the two terminals A and B shown in FIG. 3A coupled to the second end of the gate line, the other of the two terminals coupled to the common wire portions CL1 or CL2, the first control terminal 32 coupled to the control port 68-1 or 68-2, and the second control terminal 31 coupled to the control port 69-1 or 69-2. The transistors TR1 and TR2 shown in FIG. 6 correspond to the transistors TR1 and TR2 in FIG. 3C and are connected accordingly. A first capacitor C1 and a second capacitor C2 are also connected in accordance with the embodiment shown in FIG. 3C. The transistors TR1 and TR2 may be either NMOS or PMOS devices. Alternatively, although not shown in FIG. 6, each ESD prevention circuit PR1 or PR2 may also be a circuit shown in FIG. 3D where the capacitors are replaced by resistors. As yet another alternative, some of the circuits PR1 and PR2 may be circuits shown in FIG. 3C and some may be circuits shown in FIG. 3D.

Still referring to FIG. 6, the first common wire portion CL1 and the second common wire portion CL2 are coupled together by a common wire coupling circuit 58. In one embodiment, the coupling circuit 58 is a resistor. Preferably, the resistor has a resistance larger than 10 KΩ to test the circuits gate and data driver independently.

In another embodiment, the common wire coupling circuit 58 comprises a switching device connected to lines CL1 and CL2 that switches on and off. In one such embodiment, the coupling circuit has the same structure as the ESD prevention circuits PR1 and PR2, i.e., the circuit shown in FIGS. 3C or 3D. In such an embodiment, the terminals A and B shown in FIGS. 3C or 3D are connected across the lines CL1 and CL2, and the first and second control terminals 32 and 31 are connected to the control lines 57-1 and 57-2. The control line 57-1 may be connected to the control ports 68-1 or 68-2, while another control line 57-2 may be connected to the control ports 69-1 or 69-2. The operation of this embodiment is the same as that of the ESD prevention circuits PR1 and PR2.

The operation of an LCD panel according to the embodiment of FIG. 6 is explained below.

During the fabrication of the LCD panel, the control signals applied at the control ports 68-1, 68-2, 69-1 and 69-2 are in the first state so that the second transistor TR2 is preferably turned off and the gate of the first transistor TR1 is preferably in a floating state. When an induced electrostatic voltage of a sufficient magnitude is applied to one or more of the gate and data lines, a voltage is applied at the gate of the first transistors TR1 to turn on the first transistors TR1. As a result, the gate and data lines are electrically coupled to the common wires CL1 and CL2, thereby preventing electrostatic buildup in these lines. Consequently, the destruction of the insulation between the gate lines and data lines is prevented, and the pixel switching characteristics of the LCD panel are preserved.

After the fabrication of the panel is completed, the gate lines and the data lines are electrically disconnected from each other, so that the signals at each gate line and data line may be controlled independently by the driving circuits 52 and 54. This is accomplished by applying a first control signal to the control ports 68-1 and 68-2 and a second control signal to the control ports 69-1 and 69-2. Through the control ports 68-1 and 68-2, the first control signal is applied to the gate of the second transistors TR2 to turn them on. When the second transistors TR2 are turned on, the second control signal applied to the control ports 69-1 and 69-2 is conducted through transistors TR2 to the gate of the corresponding first transistors TR1. Thus, a second control signal can turn off the first transistor TR1 by applying an appropriate Aoff@ signal to the gate of the TR1.

As shown in the embodiments of the present invention, ESD is prevented during fabrication of the LCD panel by maintaining the gate lines and data lines at substantially the same voltages, by means of ESD prevention circuits that become electrically conductive to couple the gate or data lines to a common wire in response to an induced electrostatic voltage. When testing the LCD panel during fabrication, or during normal operations of the LCD panel after fabrication, the gate and data lines are electrically decoupled from each other by the application of control signals to the control terminals of the ESD prevention circuit. Consequently, in the present invention, the structural destruction of the LCD panel that may be caused by static electricity during the fabrication process is prevented. Moreover, no additional processing steps are required after the formation of the panel.

It will be apparent to those skilled in the art that various modifications and variations can be made in an LCD panel having ESD prevention circuits of the present invention without departing from the spirit or scope of the inventions. Thus, it is intended that the present invention cover the modifications and variations of this invention provided they come within the scope of the appended claims and their equivalents.

What is claimed is:

1. A liquid crystal display panel having electrostatic discharge prevention circuitry, comprising:
   a plurality of gate lines;
   a plurality of data lines, the gate lines and the data lines define an array of pixels;
   a plurality of switching devices respectively connected to the pixels, the switching devices connected to the gate lines and data lines;
   a common line; and
   a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal,
   wherein the at least one switching device comprises a transistor having a source electrode, a drain electrode and a gate electrode, one of the source and drain electrodes being coupled to one of the gate and data lines, the other of the source and drain electrodes being coupled to the common line, and the gate electrode being coupled to the control terminal, and
   wherein the electrostatic discharge prevention circuit further comprises:
      a first capacitance unit coupled to the source and the gate electrodes; and
      a second capacitance unit coupled to the drain and the gate electrodes.

2. The liquid crystal display panel according to claim 1, wherein the electrostatic discharge prevention circuit further comprises:
   a first resistance unit connected between the first source and gate electrodes; and
   a second resistance unit connected between the first drain and gate electrodes.

3. The liquid crystal display panel according to claim 1, wherein the electrostatic discharge prevention circuit further comprises:
   a first impedance unit coupled to the source and the gate electrodes; and
   a second impedance unit coupled to the drain and the gate electrodes.

4. A liquid crystal display panel having electrostatic discharge prevention circuitry, comprising:
   a plurality of gate lines;
   a plurality of data lines, the gate lines and the data lines define an array of pixels;
   a plurality of switching devices respectively connected to the pixels, the switching devices connected to the gate lines and data lines;
   a common line; and
   a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal;
   wherein the electrostatic discharge prevention circuit comprises a second control terminal, and the at least one switching device comprises:
      a first transistor having a first source electrode, a first drain electrode and a first gate electrode, one of the first source and drain electrodes being coupled to one of the gate and data lines, and the other of the first source and drain electrodes being coupled to the common line;
      a second transistor having a second source electrode, a second drain electrode and a second gate electrode, one of the second source and drain electrodes being coupled to the first gate, the other of the second source and drain electrodes being coupled to the second control terminal, and the second gate electrode being coupled to the first control terminal, wherein the first transistor operates in response to signals from the control terminal and the second control terminal;
   wherein the electrostatic discharge prevention circuit further comprises:
      a first capacitance unit connected between the first source and gate electrodes; and
      a second capacitance unit connected between the first drain and gate electrodes.

5. A liquid crystal display panel having electrostatic discharge prevention circuitry, comprising:
   a plurality of gate lines;
   a plurality of data lines, the gate lines and the data lines define an array of pixels;
   a plurality of switching devices respectively connected to the pixels, the switching devices connected to the gate lines and data lines;
   a common line; and
   a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal;
   wherein the electrostatic discharge prevention circuit comprises a second control terminal, and the at least one switching device comprises:
      a first transistor having a first source electrode, a first drain electrode and a first gate electrode, one of the first source and drain electrodes being coupled to one of the gate and data lines, and the other of the first source and drain electrodes being coupled to the common line;
      a second transistor having a second source electrode, a second drain electrode and a second gate electrode, one of the second source and drain electrodes being coupled to the first gate, the other of the second source and drain electrodes being coupled to the second control terminal, and the second gate electrode being coupled to the first control terminal, wherein the first transistor operates in response to signals from the control terminal and the second control terminal;
      a first control part coupled to the control terminal connected to the at least one switching device of the plurality of electrostatic discharge prevention circuits; and
      a second control part coupled to the second control terminal of the plurality of electrostatic discharge prevention circuits.

6. A liquid crystal display panel having electrostatic discharge prevention circuitry, comprising:
- a plurality of gate lines;
- a plurality of data lines, the gate lines and the data lines define an array of pixels;
- a plurality of switching devices respectively connected to the pixels, the switching devices connected to the gate lines and data lines;
- a common line; and
- a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal;
- wherein the common line comprises first and second common line portions, and the plurality of electrostatic discharge prevention circuits comprises a first plurality of electrostatic discharge prevention circuits each coupled to the first common line portion and a gate line, and a second plurality of electrostatic discharge prevention circuits each coupled to the second common line portion and a data line, and the liquid crystal display panel further comprises a common line coupling unit coupled to the first and second common line portions;
- wherein the common line coupling unit comprises a second switching device coupled to the first and second common line portions;
- wherein the second switching device comprises a transistor having a source electrode, a drain electrode and a gate electrode, wherein one of the source and drain electrodes is coupled to the first common line portion, the other of the source and drain electrodes is coupled to the second common line portion, and the gate electrode is coupled to the control terminal; and
- wherein the common line coupling unit further comprises:
  - a first capacitance unit connected between the first source and gate electrodes; and
  - a second capacitance unit connected between the first drain and gate electrodes.

7. A liquid crystal display panel having electrostatic discharge prevention circuitry, comprising:
- a plurality of gate lines;
- a plurality of data lines, the gate lines and the data lines define an array of pixels;
- a plurality of switching devices respectively connected to the pixels, the switching devices connected to the gate lines and data lines;
- a common line; and
- a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal;
- wherein the common line comprises first and second common line portions, and the plurality of electrostatic discharge prevention circuits comprises a first plurality of electrostatic discharge prevention circuits each coupled to the first common line portion and a gate line, and a second plurality of electrostatic discharge prevention circuits each coupled to the second common line portion and a data line, and the liquid crystal display panel further comprises a common line coupling unit coupled to the first and second common line portions; and
- wherein the common line coupling unit comprises:
  - a second control terminal;
  - a first transistor having a first source electrode, a first drain electrode and a first gate electrode, one of the first source and drain electrodes being coupled to the first common line portion, and the other of the first source and drain electrodes being coupled to the second common line portion;
  - a second transistor having a second source electrode, a second drain electrode and a second gate electrode, one of the second source and drain electrodes being coupled to the first gate electrode, the other of the second source and drain electrodes being coupled to the second control terminal, the second gate electrode being coupled to the control terminal, wherein the first transistor operates in response to signals at the control terminal and the second control terminal;
  - a first capacitance unit connected between the first source and gate electrodes; and
  - a second capacitance unit connected between the first drain and gate electrodes.

8. A liquid crystal display panel having electrostatic discharge prevention circuitry, comprising:
- a plurality of gate lines;
- a plurality of data lines, the gate lines and the data lines define an array of pixels;
- a plurality of switching devices respectively connected to the pixels, the switching devices connected to the gate lines and data lines;
- a common line;
- a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal;
- a gate driving circuit coupled to each gate line;
- a data driving circuit coupled to each data line;
- a plurality of pads coupled to the gate and data driving circuits;
- a second common line;
- a plurality of second electrostatic prevention circuits each coupled between the second common line and one of the pads, each second electrostatic discharge prevention circuit having a second switching device and a second control terminal connected to the second switching device, wherein the second switching device operates in response to a signal at the second control terminal;
- wherein the second switching device comprises a transistor having a source electrode, a drain electrode and a gate electrode, one of the source and drain electrodes being coupled to a pad, the other of the source and drain electrodes being coupled to the second common line, and the gate electrode being coupled to the second control terminal;

a first capacitance unit coupled to the source and gate electrodes; and a second capacitance unit coupled to the drain and gate electrodes.

9. A liquid crystal display panel having electrostatic discharge prevention circuitry, comprising:

a plurality of gate lines;

a plurality of data lines, the gate lines and the data lines define an array of pixels;

a plurality of switching devices respectively connected to the pixels, the switching devices connected to the gate lines and data lines;

a common line;

a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal;

a gate driving circuit coupled to each gate line;

a data driving circuit coupled to each data line;

a plurality of pads coupled to the gate and data driving circuits;

a second common line; and a plurality of second electrostatic prevention circuits each coupled between the second common line and one of the pads, each second electrostatic discharge prevention circuit having a second switching device and a second control terminal connected to the second switching device, wherein the second switching device operates in response to a signal at the second control terminal;

wherein the second electrostatic discharge prevention circuit comprises a third control terminal and the second switching device comprises:

a first transistor having a first source electrode, a first drain electrode and a first gate electrode, one of the first source and drain electrodes being coupled to a pad, and the other of the first source and drain electrodes being coupled to the second common wire;

a second transistor having a second source electrode, a second drain electrode and a second gate electrode, one of the second source and drain electrodes being coupled to the first gate, the other of the second source and drain electrodes being coupled to the third control terminal, the second gate electrode being coupled to the second control terminal, wherein the first transistor operates in response to signals at the second and third control terminals;

a first capacitance unit connected between the first source and gate electrodes; and a second capacitance unit connected between the first drain and gate electrodes.

10. A method for making a liquid crystal display panel having electrostatic discharge prevention circuitry, the method comprising:

forming a plurality of gate lines;

forming a plurality of data lines, the gate lines and the data lines defining an array of pixels;

forming a plurality of switching devices respectively connected to the pixels, the switching devices connected to the gate lines and data lines;

forming a common line; and forming a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal;

wherein the at least one switching device is formed by a transistor having a source electrode, a drain electrode and a gate electrode, one of the source and drain electrodes being coupled to one of the gate and data lines, the other of the source and drain electrodes being coupled to the common line, and the gate electrode being coupled to the control terminal;

wherein forming the electrostatic discharge prevention circuit further comprises:

forming a first capacitance unit coupled to the source and the gate electrodes; and forming a second capacitance unit coupled to the drain and the gate electrodes.

11. A method for making a liquid crystal display panel having electrostatic discharge prevention circuitry, the method comprising:

forming a plurality of gate lines;

forming a plurality of data lines, the gate lines and the data lines defining an array of pixels;

forming a plurality of switching devices respectively connected to the pixels, the switching devices connected to the gate lines and data lines;

forming a common line; and forming a plurality of electrostatic discharge prevention circuits each coupled to the common line and one of the gate and data lines, each electrostatic discharge prevention circuit having at least one switching device and at least one control terminal connected to the at least one switching device, wherein the at least one switching device operates in response to a signal from the control terminal;

wherein forming the electrostatic discharge prevention circuits comprises forming a second control terminal, and the switching device is formed comprising:

a first transistor having a first source electrode, a first drain electrode and a first gate electrode, one of the first source and drain electrodes being coupled to one of the gate and data lines, and the other of the first source and drain electrodes being coupled to the common line;

a second transistor having a second source electrode, a second drain electrode and a second gate electrode, one of the second source and drain electrodes being coupled to the first gate, the other of the second source and drain electrodes being coupled to the second control terminal, and the second gate electrode being coupled to the control terminal, wherein the first transistor operates in response to signals from the control terminal and the second control terminal; and wherein forming the electrostatic discharge prevention circuits further comprises:

forming a first capacitance unit connected between the first source and gate electrodes; and forming a second capacitance unit connected between the first drain and gate electrodes.

* * * * *